W. L. Gilroy,
Green Corn Knife.

N° 82,306. Patented Sep. 22, 1868.

Witnesses

Inventor

United States Patent Office.

WASHINGTON L. GILROY, OF PHILADELPHIA, PENNSYLVANIA.

*Letters Patent No. 82,306, dated September 22, 1868.*

---

IMPROVEMENT IN KNIFE FOR CUTTING GREEN CORN FROM THE COB.

---

*The Schedule referred to in these Letters Patent and making part of the same.*

---

TO ALL WHOM IT MAY CONCERN:

Be it known that I, WASHINGTON L. GILROY, of the city of Philadelphia, in the State of Pennsylvania, have invented a new and useful Green-Corn Knife for table-use; and I do hereby declare that the following is a full, clear, and exact description of the same, reference being had to the accompanying drawings, making a part of this specification, in which—

Figure 1:
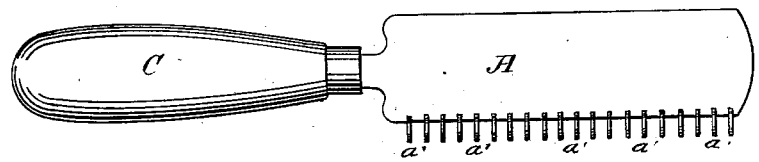
Figure 2:
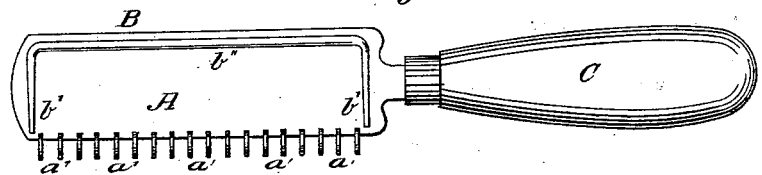
Figure 3:
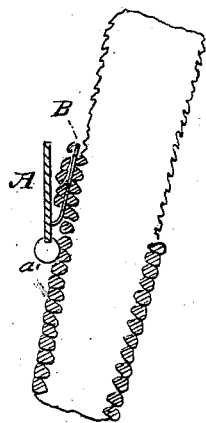

Figures 1 and 2 are respective side views of the two sides of the implement, and Figure 3 a transverse section of the same, Like letters of reference indicating the same parts when in the different figures.

It is well known that the hulls or skins of the grains of green corn are very indigestible in weak stomachs, and often cause serious derangements of the bowels, and for this reason many persons are obliged to deny to themselves and their children the pleasure of eating this delightful food. A ready means of separating the pulp of the grains from the said hulls or skins, immediately after the ears of corn are taken from the boiler, or brought warm to the table, is therefore very desirable.

The object of my invention is to remedy this objection, by providing a simple table-implement, whereby the pulp of the grains of an ear of green corn can, with facility and rapidity, be separated from the hulls or skins, and leave the latter adhering to the cob.

To enable others to understand, make, and use my said invention, I will proceed to describe its construction and mode of operation.

I make a knife-blade, A, of steel, German silver, or any other suitable metal, and fix transversely across one of its edges a series of thin circular plates, $a'$ $a'$, having cutting-edges, substantially as represented in the drawings. To one side of this blade A, I fix a cylindrical springy bar, B, by fastening its two ends, $b'$ $b'$, near to the respective ends of that edge of the blade A which has the series of cutters $a'$ projecting therefrom, and so that the intermediate portion, $b''$, of the said bar B, will "set off" half an inch, more or less, alongside of or parallel to the blade A, as represented in figs. 2 and 3. I then fasten the blade to a suitable handle, C, substantially as represented in figs. 1 and 2.

The manner of using, and the mode of its operation, will be apparent by referring to fig. 3, which represents transverse sections of the implement, and the grains of an ear of corn, as when the implement is applied and operated upon the ear, for removing the pulp from the said grains of the cob.

The ear of corn being held either in an inclined or vertical position, with its lower end resting upon a plate or any other suitable support, the operator takes the implement by its handle, C, into the other hand, and places it across the upper portion of the ear of corn, with the adjacent cutters $a'$ and the bar B in contact with the ear, the cutters being in advance or below the bar, as represented in fig. 3, and rapidly forces the adjacent cutters through the crowns of the encountered grains, so as to divide their hulls or skins, and at the same time pressing the bar B firmly against the ear, and thus forcing the pulp of the grains out from the hulls or skins, and leaving the latter adhering to the cob. The bar B being cylindrical, and somewhat springy, and yielding to moderate pressure, forces out the pulp without tearing out the hulls.

If preferred, the operator can first pass the cutters through the grains, and afterward force out the pulp by means of the bar B; but both effects can be easily accomplished at once, because the operation is very simple, and requires but little strength or skill to be entirely effective for both purposes.

The cutters $a'$ may be set in and soldered fast to the blade A, or the blade itself may be readily notched out, and the then intervening projections rounded off and sharpened at their edges, and then twisted around, so as to be at right angles, respectively, to the sides of the blade.

Having thus fully described my invention, what I claim as new, and desire to secure by Letters Patent, is confined to the following, viz:

1. A green-corn knife for table-use, having a blade, A, provided with a series of transverse cutting-edges, $a'$ $a'$, substantially as described.

2. In combination with a blade, A, and cutters $a'$ $a'$, arranged as described, I claim the bar B, arranged to operate substantially as and for the purpose described.

WASH'N L. GILROY.

Witnesses:
BENJ. MORISON,
WM. H. MORISON.